US007520951B1

(12) United States Patent
Wolf et al.

(10) Patent No.: US 7,520,951 B1
(45) Date of Patent: Apr. 21, 2009

(54) METHOD OF TRANSFERRING NANOPARTICLES TO A SURFACE

(75) Inventors: Heiko Wolf, Pfaeffikon (CH); Tobias Kraus, Saarbruecken (DE)

(73) Assignee: International Business Machines (IBM) Corporation, Armonk, NY (US)

(*) Notice: Subject to any disclaimer, the term of this patent is extended or adjusted under 35 U.S.C. 154(b) by 0 days.

(21) Appl. No.: 12/105,122

(22) Filed: Apr. 17, 2008

(51) Int. Cl.

| | |
|---|---|
| ***B44C 1/175*** | (2006.01) |
| ***B44C 1/24*** | (2006.01) |
| ***B32B 37/02*** | (2006.01) |
| ***B32B 37/10*** | (2006.01) |
| ***B32B 37/12*** | (2006.01) |
| *D06N 7/04* | (2006.01) |
| *B32B 37/06* | (2006.01) |
| *B32B 38/18* | (2006.01) |
| *B05D 1/38* | (2006.01) |

(52) U.S. Cl. ........................ 156/235; 156/230; 156/232; 156/241; 156/314; 156/238; 156/290; 156/297; 156/541; 156/548; 427/258; 427/282

(58) Field of Classification Search ................. 156/230, 156/232, 235, 238, 241, 242, 245, 290, 297, 156/314–319, 524, 531, 539–541, 548, 575, 156/578; 427/255.25, 258, 282, 581, 901
See application file for complete search history.

(56) References Cited

U.S. PATENT DOCUMENTS

| | | | |
|---|---|---|---|
| 5,647,935 | A | 7/1997 | Hoshino et al. |
| 5,735,989 | A | 4/1998 | Stepanek |
| 5,976,296 | A | 11/1999 | Sherman et al. |
| 6,174,405 | B1 | 1/2001 | Clarke |
| 6,342,119 | B1 | 1/2002 | Shih |
| 6,623,579 | B1 | 9/2003 | Smith et al. |
| 6,683,663 | B1 | 1/2004 | Hadley et al. |
| 6,731,353 | B1 | 5/2004 | Credelle et al. |

(Continued)

FOREIGN PATENT DOCUMENTS

| | | |
|---|---|---|
| AU | 2003/256329 | 1/2004 |

(Continued)

OTHER PUBLICATIONS

Tobias Kraus et al., "Nanoparticle printing with single-particle resolution" Articles, Nature Publishing Group, pp. 570-576, Sep. 2, 2007.

(Continued)

*Primary Examiner*—Philip C Tucker
*Assistant Examiner*—Sonya Mazumdar
(74) *Attorney, Agent, or Firm*—Wenderoth, Lind & Ponack, L.L.P.

(57) ABSTRACT

A method of transferring nanoparticles to a surface is provided. The method includes rotating a perimeter surface through a colloidal solution such that nanoparticles are captured by binding sites, removing liquid from the captured nanoparticles and rotating a take-up roll such that the captured nanoparticles contact a carrier surface. Moreover, the method includes removing the captured nanoparticles from the perimeter surface and transferring the nanoparticles to the carrier surface with a carrier adhesive material, rotating the carrier surface such that the transferred nanoparticles contact a target substrate, and removing the transferred nanoparticles from the carrier surface and transferring the transferred nanoparticles to the target substrate with a target substrate material.

1 Claim, 1 Drawing Sheet

U.S. PATENT DOCUMENTS

| | | | |
|---|---|---|---|
| 6,770,162 B2 | 8/2004 | Shida et al. | |
| 6,895,645 B2 | 5/2005 | Xu et al. | |
| 7,306,316 B2 | 12/2007 | Doak | |
| 7,352,558 B2 | 4/2008 | Zhong et al. | |
| 7,381,361 B2 | 6/2008 | Sundararajan | |
| 7,384,879 B2 | 6/2008 | Roberts et al. | |
| 2005/0041084 A1 | 2/2005 | Mukherjee et al. | |
| 2005/0178495 A1 | 8/2005 | Aspar et al. | |
| 2006/0188721 A1 | 8/2006 | Irvin, Jr. et al. | |
| 2006/0194252 A1 | 8/2006 | Hunt et al. | |
| 2006/0275549 A1 * | 12/2006 | Subramanian et al. | 427/282 |
| 2007/0096083 A1 | 5/2007 | Raravaikar et al. | |
| 2007/0202247 A1 | 8/2007 | Peters et al. | |
| 2007/0228606 A1 | 10/2007 | Hanefeld et al. | |
| 2007/0254107 A1 | 11/2007 | Rao et al. | |
| 2008/0038532 A1 | 2/2008 | Yi et al. | |
| 2008/0090071 A1 | 4/2008 | Valle et al. | |
| 2008/0090951 A1 | 4/2008 | Mao et al. | |
| 2008/0099339 A1 | 5/2008 | Zhou et al. | |
| 2008/0102127 A1 | 5/2008 | Gao et al. | |
| 2008/0114106 A1 | 5/2008 | Kaliaguine et al. | |

FOREIGN PATENT DOCUMENTS

| | | |
|---|---|---|
| EP | 1509585 | 3/2005 |
| EP | 1906237 | 4/2008 |
| EP | 1831328 | 5/2008 |
| EP | 1936445 | 6/2008 |
| WO | 2003/10660 | 12/2003 |
| WO | 2004/003160 | 1/2004 |
| WO | 2007/018953 | 2/2007 |
| WO | 2007/076233 | 7/2007 |
| WO | 2007/111996 | 10/2007 |
| WO | 2007/120840 | 10/2007 |
| WO | WO 2007/111996 A2 * | 10/2007 |
| WO | 2007/145701 | 12/2007 |
| WO | 2008/027571 | 3/2008 |
| WO | 2008/028130 | 3/2008 |
| WO | 2008/031035 | 3/2008 |
| WO | 2008/033303 | 3/2008 |
| WO | 2008/041951 | 4/2008 |
| WO | 2008/045022 | 4/2008 |
| WO | 2008/048305 | 4/2008 |
| WO | 2008/054411 | 5/2008 |
| WO | 2008/054833 | 5/2008 |
| WO | 2008/055311 | 5/2008 |
| WO | 2008/060640 | 5/2008 |
| WO | 2008/060660 | 5/2008 |
| WO | 2008/070926 | 6/2008 |

OTHER PUBLICATIONS

D.R. Hines et al., “Transfer printing methods for the fabrication of flexible organic electronics”, Journal of Applied Physics, 101, 024503, pp. 1-9, 2007.

Laurent Malaquin et al., “Controlled Particle Placement through Convective and Capillary Assembly”, American Chemical Society, 23, pp. 11513-11521, 2007.

Tobias Kraus et al., “Closing the Gap Between Self-Assembly and Microsystems Using Self-Assembly, Transfer, and Integration of Particles”, Advanced Materials, pp. 2438-2442, Sep. 5, 2005.

M.R. Falvo et al., “Nanometre-scale rolling and sliding carbon nanotubes”, letter to nature, vol. 397, pp. 236-238, Jan. 21, 1999.

S. J. Mohammed et al., “Fabrication of interdigitated micro patterns of self-assembled polymer nanofilms containing cell-adhesive materials”, Langmuir, 14;22(6)2738-46; Mar. 2006.

W.J. Dauksher et al., “Nano-imprint lithography: Templates, imprinting and wafer pattern transfer”, Microelectronic Engineering, vol. 83, Issues 4-9, Apr.-Sep. 2006 (Abstract).

Article by Baker Hughes Incorporated and Elizabeth Yuan entitled: “Specialty Polyolefins and Small Particle Size Plyolefin Dispersions for Digital Printing and Media”, published by IP.com Electronic Publication on Sep. 27, 2007.

Article by IBM TDB entitled: “Ultra-Shallow Junction Doping and Simultaneous Silicide Contact Formation By Selective Plating”, published by IP.com Electronic Publication on Jun. 20, 2003 (original publication date: Oct. 3, 2002).

* cited by examiner

METHOD OF TRANSFERRING NANOPARTICLES TO A SURFACE

BACKGROUND OF THE INVENTION

This invention relates generally to the transfer of particles to a surface, and more particularly, to a method of continuously transferring nanoparticles to a surface.

Small particles having well-defined compositions, shapes, structures and sizes have been synthesized and are known as nanoparticles. Nanoparticles have advantageous properties that render them suitable as potential building blocks for the fabrication of nanosystems. For example, nanoparticles may be used in electronic, optical and biologic applications that exploit nanoparticles' confined electronic systems, strong interaction with light, well-defined surfaced properties, high catalytic activity and their quantum confinement properties. Nanoparticles may be used in such applications as functional entities if they can be arranged and integrated on a surface, between electrodes or in a device in high-accuracy patterns.

SUMMARY OF THE INVENTION

A method of transferring nanoparticles to a surface is provided. The method includes positioning a take-up roll, a carrier roll and a target roll in working communication with each other. The take-up roll includes a perimeter surface having binding sites that include one of openings and binding site adhesive material, and that are positioned to form a desired pattern. The carrier roll includes a carrier surface including a carrier adhesive material that exerts a higher adhesive force than the binding sites. A target substrate is provided that translates about the target roll and includes a target substrate adhesive material that exerts a higher adhesive force than the carrier adhesive material. Moreover, the method includes positioning the perimeter surface in a colloidal solution containing nanoparticles, and rotating the perimeter surface through the colloidal solution such that nanoparticles are captured by the binding sites. Furthermore, the method includes removing liquid from the captured nanoparticles and rotating the take-up roll such that the captured nanoparticles contact the carrier surface, removing the captured nanoparticles from the perimeter surface and transferring the nanoparticles to the carrier surface with the carrier adhesive material, rotating the carrier roll such that the transferred nanoparticles contact the target substrate, and removing the transferred nanoparticles from the carrier surface and transferring the transferred nanoparticles to the target substrate with the target substrate material.

DETAILED DESCRIPTION OF THE INVENTION

Figure 1:
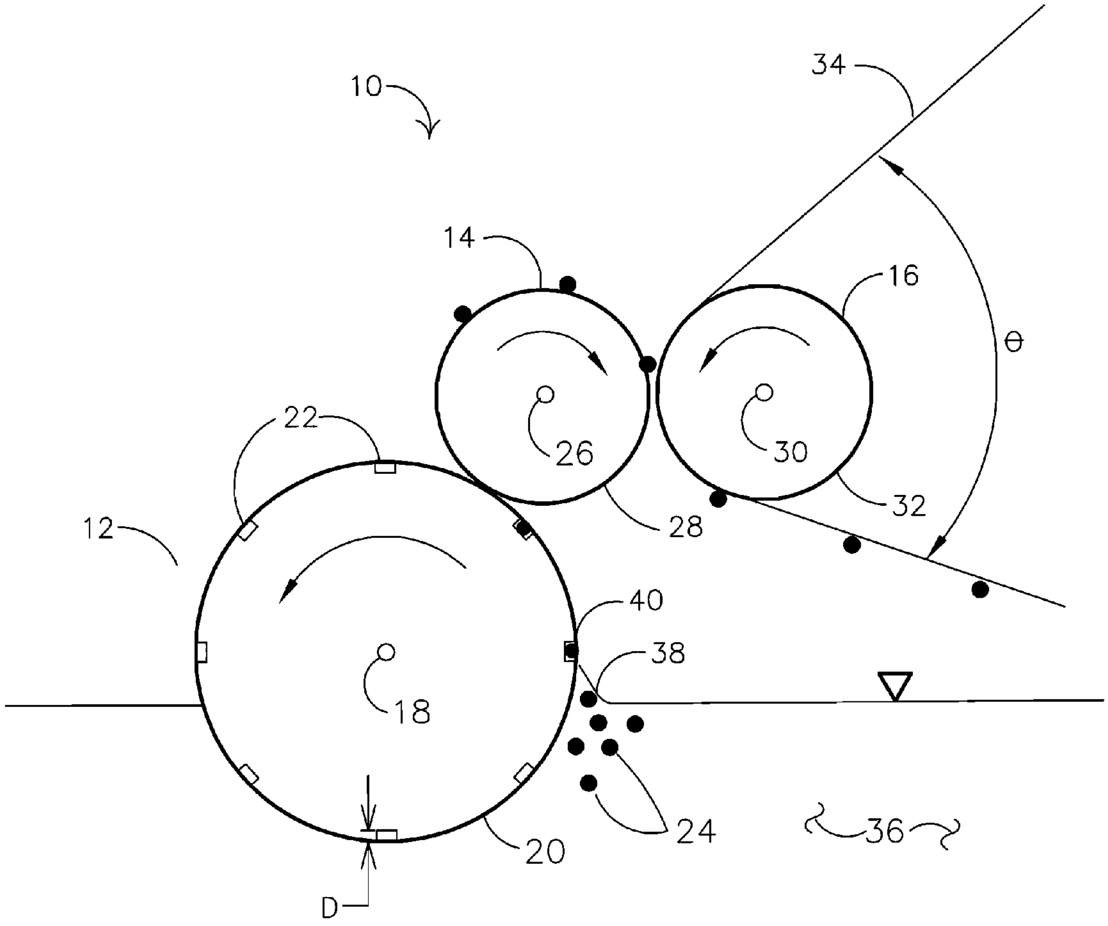
FIG. 1 is a schematic illustration of an exemplary assembly that may be used to accurately place and integrate nanoparticles on a large scale surface.

FIG. 1 is a schematic illustration of an exemplary apparatus 10 that may be used to accurately place and integrate nanoparticles on a large scale surface. In the exemplary embodiment, the apparatus 10 includes a take-up roll 12, a carrier roll 14, a target roll 16 and a motor (not shown). The take-up roll 12 includes a center 18, a perimeter surface 20 that functions as a take-up surface, a circular cross-section and is rotated about an axis defined by the center 18. The perimeter surface 20 constitutes a hydrophobic template that includes binding sites 22 that are designed to capture nanoparticles 24 and are radially spaced about the perimeter surface 20.

In the exemplary embodiment, each binding site 22 constitutes a series of openings, each having a common diameter, that are linearly and uniformly spaced along a length of the roll 12. However, it should be understood that in other embodiments, binding sites 22 may take any form and be arranged to define any desired pattern on the perimeter surface 20. For example, each binding site 22 may constitute a series of openings each having a different diameter, or any combination of diameters, and that are linearly and uniformly, or non-uniformly, spaced along the length of roll 12. The openings of each binding site 22 may be arranged non-linearly and may have any desired shape, such as, but not limited to: circular, triangular, rectangular and elliptical. Moreover, each binding site 22 may constitute at least one groove that extends for part or all of the length of roll 12. Furthermore, the binding sites 22 may constitute protruding structures such as, but not limited to, corners having 90° angles. It should be appreciated that the binding sites 22 are not required to be radially positioned and separated about the perimeter surface 20, and may be positioned at any location about the perimeter surface 20.

It should be understood that, regardless of the shape of the binding sites 22 and the pattern formed by the binding sites 22, a depth D of each opening should be less than a size of desired nanoparticles 24. For example, nanoparticles 24 generally have a size ranging from 1 nanometer (nm) to one micron. Thus, because many differently sized nanoparticles 24 may be used, the depth D varies accordingly. In the exemplary embodiment, nanoparticles 24 are particles of materials such as, but not limited to, polystyrene and gold.

In other embodiments, the binding sites 22 may constitute materials that have desired chemical functionalities, such as increased adhesion, that are conducive to attracting a desired type of nanoparticle 24. These chemical material binding sites 22 may also be positioned at any location on perimeter surface 20 to form any desired pattern of nanoparticles 24. Moreover, the chemical material binding sites 22 may constitute any chemical material having suitable adhesive properties that facilitate capturing and retaining desired nanoparticles 24 on the perimeter surface 20. Such chemicals include, but are not limited to, polyelectrolytes.

Moreover, it should be appreciated that in other embodiments a plurality of rolls 12 may be provided. Specifically, each roll 12 may include a different pattern of binding sites 22 and different types of binding sites 22. A roll 12 having a pattern and type of binding site corresponding to a desired pattern and type of binding site 22 is installed in apparatus 10. Furthermore, instead of providing a plurality of rolls 12, a single roll 12 and a plurality of different roll covers may be provided. Specifically, each roll cover may include a different pattern of binding sites 22 and different types of binding sites 22, and is configured to be secured to at least part of the perimeter surface 20. Consequently, roll covers including desired patterns and types of binding sites 22 may be quickly and easily changed, thus facilitating fast and efficient transfer of nanoparticles in highly accurate and different patterns.

The carrier roll 14 includes a center 26, a circular cross-section and a carrier surface 28 defined by the perimeter of carrier roll 14. The carrier surface 28 includes a film of material having a high degree of adhesion such as, but not limited to, a silicone elastomer, poly(dimethylsiloxane) (PDMS), and a thin glass sheet. It should be appreciated that the film material should have a higher adhesive force than the binding sites 22, and also facilitate releasing the nanoparticles 24 to a target substrate 34 when transferring the nanoparticles.

The target roll 16 includes a center 30, a target perimeter surface 32 defined by the perimeter of target roll 16 and a circular cross-section. The target roll 16 is positioned to rotate such that the target substrate 34 translates over the perimeter surface 32 and such that a non-processed portion and a processed portion of the substrate 34 form an angle θ. Angle θ may be any angle that facilitates transfer of nanoparticles 24 from the carrier roll 14 to the target substrate 34. Moreover, in the exemplary embodiment, the target substrate 34 is manufactured from material that has a high degree of adhesion to facilitate transferring desired nanoparticles 24 to the target substrate 34. Such materials include, but are not limited to, polymers and spin-on glass. It should be appreciated that adhesive properties of the substrate material may be increased by heating to facilitate transferring nanoparticles 24 from the carrier roll 14 to the target substrate 34.

The apparatus 10 is assembled by orienting the roll 12, the carrier roll 14 and the target roll 16 such that they communicate in a working relationship while being driven by the motor (not shown). Specifically, the rolls 12, 14, and 16 are positioned parallel to each other such that the perimeter surface 20 is proximate the carrier surface 28, and the carrier surface 28 is proximate the target surface 32. That is, the perimeter surface 20 and the carrier surface 28 are spaced from each other such that nanoparticles 24 captured by the binding sites 22 may be transferred to the carrier surface 28 without being damaged. Likewise, the carrier surface 28 and the target surface 32 are spaced from each other such that nanoparticles 24 retained on the carrier surface 28 may be transferred to the target substrate 34 without being damaged.

Prior to operation of the apparatus 10, the apparatus 10 is positioned such that the perimeter surface 20 is partially submersed in a colloidal solution 36. It should be appreciated that the colloidal solution 36 may contain any kind of nanoparticle 24 to be used for a desired application.

During operation, the perimeter surface 20 rotates through the solution 36 such that the meniscus 38 establishes a contact line 40 at the interface between the surface 20 and the solution 36. As the surface 20 exits from the solution 36, nanoparticles 24 located in the meniscus 38 are captured by the binding sites 22. Specifically, the geometrical confinement of the binding sites 22 leads to a selective immobilization of the nanoparticles 24 in the binding sites 22. Moreover, through directed assembly at the three-phase boundary lines (i.e., meniscus being a solid, colloidal solution being a liquid, and air a gas), the nanoparticles 24 are assembled in the binding sites 22.

The temperature of the solution 36 should be above the dew point temperature to facilitate increasing the number of nanoparticles 24 captured and the speed with which they are captured. By increasing the temperature above the dew point temperature, evaporation occurs such that a convective flow develops in the solution 36, which in turn induces a nanoparticle influx towards the contact line 40. It should be appreciated that in the exemplary embodiment, the temperature of the solution 36 should be between about 20° C. and 40° C.

After capturing the nanoparticles 24 on the binding sites 22, the surface 20 rotates such that after the liquid is removed from the nanoparticles 24, the nanoparticles 24 come into contact with rotating carrier surface 28. The carrier surface 28 is manufactured from a material that exerts a higher adhesion force on the nanoparticles 24 than the binding sites 22, and rotates such that it continuously removes the nanoparticles 24 from the rotating perimeter surface 20. Thus, nanoparticles 24 are transferred from the perimeter surface 20 to the carrier surface 28. As the carrier surface 28 rotates after capturing the transferred nanoparticles 24, the transferred nanoparticles 24 come into contact with the target substrate 34 translating about the rotating target surface 32. The target substrate 34 is designed to exert a higher adhesion force on the nanoparticles 24 than the carrier surface 28. Thus, by contacting the target substrate 34, the nanoparticles 24 are transferred to the substrate 34 such that the nanoparticles 24 are deposited on the substrate 34 in a continuous process.

In the exemplary embodiment, the substrate 34 translates at a constant speed between about 0.1 to 20 microns per second. Consequently, the rolls 12, 14 and 16 rotate at relative speeds and in concert such that substrate 34 translates at a desired speed within this range. However, the speed of rotation of roll 12 also depends on the temperature of the solution 36 and the concentration of nanoparticles 24 in the solution 36. Thus, when determining the desired speed, consideration should be given to the maximum rotational speed of roll 12 such that an adequate number of nanoparticles 24 are captured. It should be appreciated that rolls 12, 14 and 16 may each have the same or different radii. There is no required specific relationship between the respective radii; however, the radii should be designed such that the apparatus 10 functions as described herein.

Although the exemplary embodiment includes three rolls 12, 14 and 16, in other embodiments the nanoparticles 24 may be transferred directly from the perimeter surface 20 to the substrate 34. Specifically, other embodiments may only include rolls 12 and 16 such that the perimeter surface 20 and the target surface 32 are arranged proximate each other. Thus arranged, as the roll 12 rotates, nanoparticles 24 come into contact with the target substrate 34. Because the target substrate 34 is designed to exert a higher adhesion force on the nanoparticles 24 than the binding sites 22, the nanoparticles 24 are transferred to the substrate 34 such that the nanoparticles 24 are deposited on the substrate 34 in a continuous process.

In the exemplary embodiment, by rotating rolls 12, 14 and 16 in concert such that perimeter surface 20 captures a desired quantity of nanoparticles 24, nanoparticles 24 are transferred to rolls 14 and 16 such that they are continuously deposited on the substrate 34 in a desired pattern and within a desired period of time. Thus, the exemplary embodiment facilitates implementing useful nanoparticle 24 applications requiring large areas of patterned nanoparticles with high throughput and low costs.

An exemplary embodiment of a continuous roll-to-roll manufacturing process is described above in detail. The manufacturing process is not limited to use with the specific apparatus 10 described herein, but rather, the manufacturing method can be practiced using assemblies other than those described herein. Moreover, the invention is not limited to the embodiments of the manufacturing process described above in detail. Rather, other variations of manufacturing process embodiments may be utilized within the spirit and scope of the claims.

Furthermore, the present invention can be directed to a system for transferring nanoparticles to a surface. In addition, the present invention can also be implemented as a program for causing a computer to operate the rolls 12, 14, and 16 such that they function to transfer nanoparticles as described herein. The program can be distributed via a computer-readable storage medium such as a CD-ROM.

While the invention has been described in terms of various specific embodiments, those skilled in the art will recognize that the invention can be practiced with modification within the spirit and scope of the claims.

The invention claimed is:

1. A method of transferring nanoparticles to a surface comprising:

positioning a take-up roll, a carrier roll and a target roll in working communication with each other, wherein:

the take-up roll comprises a perimeter surface including binding sites that comprise one of openings and binding site adhesive material and are positioned to form a desired pattern;

the carrier roll comprises a carrier surface including a carrier adhesive material that exerts a higher adhesive force than the binding sites; and a target substrate translates about the target roll and includes a target substrate adhesive material that exerts a higher adhesive force than the carrier adhesive material, positioning the perimeter surface partially in a colloidal solution containing nanoparticles, and rotating the perimeter surface through the colloidal solution such that nanoparticles are captured by the binding sites;

removing liquid from the captured nanoparticles and rotating the take-up roll such that the captured nanoparticles contact the carrier surface;

removing the captured nanoparticles from the perimeter surface and transferring the nanoparticles to the carrier surface with the carrier adhesive material;

rotating the carrier roll such that the transferred nanoparticles contact the target substrate; and removing the transferred nanoparticles from the carrier surface and transferring the transferred nanoparticles to the target substrate with the target substrate material.

* * * * *